_United States Patent_ [19]

Jenkins

[11] 3,856,551

[45] Dec. 24, 1974

[54] PRESSURE SENSITIVE COPYING PAPER

[75] Inventor: Frank Llewellyn Jenkins, Chesham, England

[73] Assignee: Wiggins Teape Research & Development Limited, London, England

[22] Filed: Jan. 3, 1972

[21] Appl. No.: 215,079

Related U.S. Application Data

[63] Continuation-in-part of Ser. No. 886,741, Dec. 19, 1969, abandoned.

[30] Foreign Application Priority Data

Dec. 24, 1968 Great Britain .................... 61358/68

[52] U.S. Cl. ............ 117/36.2, 106/308 M, 117/36.8, 117/36.9, 117/100 S, 117/155 L
[51] Int. Cl. ............................................. B41m 5/22
[58] Field of Search ..... 117/36.2, 36.8, 36.9, 100 S, 117/308 M, 308 B

[56] References Cited
UNITED STATES PATENTS
2,972,547   2/1961   Tiem ................................. 117/36.2
3,455,721   7/1969   Phillips et al. ..................... 117/36.2
3,466,184   9/1969   Bowler et al. ...................... 117/36.2

_Primary Examiner_—Ralph Husack
_Attorney, Agent, or Firm_—Burns, Doane, Swecker & Mathis

[57] ABSTRACT

In copying paper for use in a pressure-sensitive copying system of the kind in which copying is effected by reacting together a colour-former and a colour-reactant, the colour-reactant is formed by fine particles of oil-absorptive, inorganic, mineral material, the particles being individually coated, at least in part, with an organic, acidic, oil-soluble polymer containing uncombined phenolic hydroxyl groups, said polymer being reactive with the colour-former to develop it to the coloured form. The polymer may be a phenol/formaldehyde or a phenol/acetylene polymer and the mineral particles may consist of silicates, aluminosilicates, silica, alumina or silica/alumina mixtures. In one example they are kaolin.

5 Claims, No Drawings

PRESSURE SENSITIVE COPYING PAPER

CROSS REFERENCE TO RELATED APPLICATION

This is a continuation-in-part of copending application Ser. No. 886,741, filed Dec. 19, 1969, now abandoned.

BACKGROUND OF THE INVENTION

1. Field of the Invention

This invention relates to copying paper, and more particularly to paper for use in pressure-sensitive copying systems of the kind in which copying is effected by reacting together colour-formers and colour-reactants, the colour-reactants being acidic materials which react with certain colour-formers to develop them from the colourless to a coloured form.

2. Description of the Prior Art

Examples of colour-formers which may be used are triphenyl-carbinol derivatives, diphenyl-carbinol derivatives, leucauramine derivatives, leucodyes, tetraarylethane diol derivatives, xanthene derivatives, and spirodipyran derivatives. The colour-formers are usually present in solution or suspension in an oily solvent, and premature development by accidental contact with the colour-reactants is prevented by, for example, encapsulation of the colour-formers.

Two important types of colour-reactant are, (1) a natural or synthetic acidic mineral, and (2) a polymer containing acidic groups. Many colour-reactants of the first type give good image intensity but the images formed are often unstable and deteriorate in moist conditions and under the influence of ultra-violet or visible light. Colour-reactants of the second type can often overcome the disadvantages of those of the first type, but when used in their natural state or in a ground or powdered form, the image intensity, particularly the initial image intensity, is frequently not acceptable.

It has been suggested (see for example British Pat. No. 1,065,587) that colour-reactants of the first and second types be used together in admixture in order to obtain a combination of their desirable properties.

SUMMARY OF THE INVENTION

According to this invention there is provided a web or sheet of paper having on a surface thereof a coating capable of developing a colour-former from the colourless to a coloured form, in which the coating includes fine particles of oil-absorptive, inorganic, mineral material, the particles being individually coated, at least in part, with an organic, acidic, oil-soluble polymer containing uncombined phenolic hydroxyl groups, which polymer is reactive with the colour-former to develop it to the coloured form.

DESCRIPTION OF PREFERRED EMBODIMENTS

The mineral material can be a synthetic or natural mineral or a treated natural mineral such as a silicate, an alumino-silicate, silica, alumina, or silica/alumina mixtures. Such minerals, in the finely divided state, are naturally oil-absorptive so that in the copying process they will absorb the oil solvent, in which the colour-former is dissolved or suspended.

The term "treated natural mineral" is used herein to denote a natural mineral treated by a hydrothermal treatment with or without pressure, or by calcining or by acid treatment or a combination of any of these methods.

The polymer may be a phenol/formaldehyde polymer or a phenol/acetylene polymer. The following polymers are preferred in their respective classes namely: R 254, a paraphenyl phenol/formaldehyde polymer supplied by Bakelite Ltd: and ROCSOL (Registered Trade Mark), a paratertiary butyl phenol/acetylene polymer supplied by Fine Dyestuffs and Chemicals Ltd. Polymers of differing molecular weight may be used, such as the dimer and pentamer of the para-tertiary octyl phenol-formaldehyde condensation product, which have very similar functional properties and the word polymer is used herein to cover all such polymers and dimers.

Coating of the mineral particles may be carried out by any conventional means such as hot or cold ball milling or kneading, absorption from aqueous or non-aqueous solution, spray drying, in situ polymerisation, micronisation ('Micronise' is a Registered Trade Mark), or coating from a colloidal suspension or emulsion.

The preferred method of coating is by absorption from a non-aqueous solution, and preferably the concentration of the solution should be one which gives a monomolecular layer of the polymer on the mineral particles. The concentration of polymer solution which gives such monomolecular layer coverage can be deduced in known manner from a plot of the absorption isotherm. The isotherm is determined by shaking 100 ml aliquots of polymer solution at 1, 2, 3, 4 and 5 percent weight/volume levels of polymer, with 10 g of the mineral particles for 18 hours. After centrifugation for 1 hour the supernatant solution is analysed for polymer concentration.

Polymer analysis is conveniently carried out by means of an infra-red spectrophotometer. The solvent normally chosen for making up the polymer solutions is carbon tetrachloride because this simplifies the analysis. However, any solvent may be used if a suitable means of analysis is found. Non-polar solvents are preferable to polar solvents because the former are less likely to be absorbed preferentially to the polymer on the surface of the mineral particles.

Polymer coated mineral particles for incorporating into a coating mix can be prepared by shaking 50 g of the mineral particles with 500 ml of polymer solution at the predetermined (as above described) concentration. The product is isolated by filtration and then dried at 70° C.

The polymer coated mineral particles may be incorporated into a colour-reactant coating mix in the following manner:

|   | Dry Wt. (%) | Wet Wt. (g) |
| --- | --- | --- |
| 1. Polymer Coated Mineral | 32 | 32 |
| 2. Sodium Silicate | 0.35 | 0.7 |
| 3. Kaolin | 57.65 | 58 |
| 4. Styrenebutadiene latex | 10 | 20 |
| Water |  | 140 |

The Constituents are added to the water in the order shown, with mixing until a homogeneous mixture is obtained. This mixture is then coated onto a web or sheet of paper to give the required coating weight, and the web or sheet then dried.

An encapsulated colour-former coating mix can then be applied to form a coating on the surface of the web or sheet of paper to provide what is known as a "self-contained" or "autogenous" web or sheet of paper.

The following Tables relate to the more usual arrangement in which the encapsulated colour-formers are coated on to one sheet of paper, and the colour-reactants, i.e. the polymer coated mineral particles, are coated onto a separate sheet of paper, a print being obtained by superposing the colour-former sheet on the colour-reactant sheet, with their coatings adjacent, and then applying a predetermined pressure to the uncoated surface of the colour-former sheet. The intensities of the print obtained and its background are then compared and the print intensity is calculated therefrom, as follows.

The print intensity is expressed as a percentage and is equal to R print × 100/R background, where R print and R background are reflectance readings obtained from the print obtained and its background, i.e. the colour-reactant coated surface. Thus, the lower the value of print intensity the more intense is the print.

Table I compares the print intensity properties of a sheet according to this invention and a sheet carrying a mere admixture of the polymer (in particle form) and the mineral particles when equal quantities of the polymer and mineral particles are used in each case, the print intensities being measured at three different times after initial formation.

TABLE I

| POLYMER | MINERAL PARTICLES | | PRINT INTENSITY | | |
|---|---|---|---|---|---|
| | | | 30 sec. | 60 sec. | 1 hour |
| Para-phenyl phenol-formaldehyde polymer | GASIL 35 (Silica) | Polymer Coated Mineral Particles | 48 | 47 | 45 |
| | | Mixture | 54 | 51 | 50 |
| Para-octyl phenol-formaldehyde polymer | GASIL 35 (Silica) | Polymer Coated Mineral Particles | 46 | 46 | 46 |
| | | Mixture | 51 | 50 | 47 |

GASIL (Registered Trade Mark) is supplied by J. Crosfield & Sons Ltd.

Table II shows examples of the use of various minerals with paraphenyl phenol formaldehyde polymer (surface area = 3 m²/g after ball milling) and again compares the print intensity properties of mere admixtures and coated particles.

TABLE II

| Mineral Particles | Surface Area m²/g | Mean Pore Diameter | | PRINT INTENSITY | | |
|---|---|---|---|---|---|---|
| | | | | 30 sec. | 60 sec. | 1 hour |
| Kaolin | 6 | above 50A | Coated Particles | 88 | 87 | 86 |
| | | | Mixture | 91 | 90 | 89 |
| Treated natural mineral | 125 | above 50A | Coated Particles | 62 | 58 | 59 |
| | | | Mixture | 63 | 61 | 59 |
| GASIL 35 (Silica) | 350 | 114A | Coated Particles | 48 | 47 | 45 |
| | | | Mixture | 54 | 51 | 50 |

As stated before polymers of differing molecular weights may be used and Table III shows the similarity of the functional properties of the dimer and pentamer of the paratertiary octyl phenol/formaldehyde condensation product.

TABLE III

Para-tertiary Octyl Phenol/Formaldehyde Polymer Coated On to GASIL 35. Artificial Light (Fluorescent) Fade Results - Print Intensity Initially and after 18 days.

| Polymer | Initial | Faded | Difference |
|---|---|---|---|
| Pentamer | 53 | 72 | 19 |
| Dimer | 50 | 74 | 24 |

It has been found that the use of colour-reactants in the form of polymer coated mineral particles requires the use of less colour-former than would be required when using either the mineral particles or the polymer reactant alone, to produce a comparable print, as can be seen from Table IV which compares the print intensities obtained from the use of colour-reactant coating mixes as indicated.

TABLE IV

| Colour-Reactant | Weight of Polymer in Mix (g) | Weight of Silica in Mix (g) | Weight of Colour-Former | Print Intensity | |
|---|---|---|---|---|---|
| | | | | 30 sec. | 60 sec. |
| Para-phenyl phenol-formaldehyde polymer coated silica | 6.4 | 25.6 | 7 g/m² | 48 | 47 |
| | | | 4 g/m² | 52 | 51 |
| | | | 2 g/m² | 80 | 79 |
| Para-phenyl phenol-formaldehyde polymer alone | 6.4 | 0 | 7 g/m² | 80 | 76 |
| Silica alone | 0 | 25.6 | 7 g/m² | 56 | 55 |

(The total mineral content was made the same in each case by incorporating a kaolin clay.)

This fact is economically important since the colour former components used are expensive.

Similarly if the amount of colour-former used is kept constant it is found that prints having an intensity greater than that previously obtainable are produced, as can be seen in Table V.

TABLE V

| COLOUR-REACTANT | PRINT INTENSITY | | |
|---|---|---|---|
| | 30 sec. | 60 sec. | 1 hour |
| Para-phenyl phenol-formaldehyde polymer coated GASIL 35 (silica) | 48 | 47 | 45 |
| Standard mineral colour-reactant system | 56 | 54 | 53 |
| Standard polymer colour-reactant system | 63 | 52 | 51 |

The standard mineral colour-reactant system comprises a treated natural mineral, talc, silica, a dispersant and a binder. The standard polymer colour-reactant system comprises a ground phenol formaldehyde resin, kaolin clay, silica, a dispersant and a binder.

Furthermore, to obtain the same print intensity values the quantity of polymer required is reduced considerably in comparison to that used previously.

I claim:

1. In a web or sheet of paper having on a surface thereof a coating capable of developing a colour former from the colourless to a coloured form, in which the coating includes fine particles of inorganic acidic, oil-absorptive, mineral material and an organic, acidic polymer, the improvement comprising the mineral particles being silica having a surface area greater than 100 m²/g and being individually coated with an organic, acidic polymer containing phenolic hydroxyl groups, which polymer is reactive with the colour-former to develop it to the coloured form and is coated on the particles in an amount sufficient to develop the colour-former to the coloured form.

2. A web or sheet of paper according to claim 1, in which the polymer is a phenol/formaldehyde polymer.

3. A web or sheet of paper according to claim 1, in which the polymer is a phenol/acetylene polymer.

4. A web or sheet of paper according to claim 1, in which the coating includes the colour-former in encapsulated form.

5. In a pressure sensitive copying paper of the kind in which copying is effected by reacting together a colour-former component and a colour-reactant component, in which the pressure sensitive copying paper comprises a coating including fine particles of inorganic acidic, oil-absorptive, mineral material and an organic, acidic polymer, the improvement comprising the mineral particles being silica having a surface area greater than 100 m²/g and having a mean pore diameter greater than 25 A, and having the polymer containing phenolic hydroxyl groups bonded to the surfaces thereof to provide on the surfaces a monomolecular layer coverage as determined by a graph of the absorption isotherm of said polymer in a carbon tetrachloride solution having a polymer concentration ranging from about 1 to about 5 percent.

* * * * *